US011520114B2

(12) United States Patent
Boxer et al.

(10) Patent No.: US 11,520,114 B2
(45) Date of Patent: Dec. 6, 2022

(54) OPTICAL FIBER CABLE HAVING ROLLABLE RIBBONS AND CENTRAL STRENGTH MEMBER

(71) Applicant: OFS Fitel, LLC, Norcross, GA (US)

(72) Inventors: Mark A Boxer, Pinetown, NC (US); Jeffrey J Bush, Duluth, GA (US); John E George, Cumming, GA (US); Howard M Kemp, Brandon, FL (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 17/290,320

(22) PCT Filed: Nov. 18, 2019

(86) PCT No.: PCT/US2019/061921
§ 371 (c)(1),
(2) Date: Apr. 30, 2021

(87) PCT Pub. No.: WO2020/106595
PCT Pub. Date: May 28, 2020

(65) Prior Publication Data
US 2021/0302677 A1 Sep. 30, 2021

Related U.S. Application Data

(60) Provisional application No. 62/769,835, filed on Nov. 20, 2018.

(51) Int. Cl.
*G02B 6/44* (2006.01)

(52) U.S. Cl.
CPC .......... *G02B 6/4403* (2013.01); *G02B 6/441* (2013.01); *G02B 6/4434* (2013.01)

(58) Field of Classification Search
CPC ..... G02B 6/4403; G02B 6/441; G02B 6/4434
USPC ......................................... 385/114
See application file for complete search history.

(56) References Cited

U.S. PATENT DOCUMENTS

2002/0197030 A1* 12/2002 McAlpine .............. G02B 6/441
385/103
2015/0192748 A1* 7/2015 Sato ....................... G02B 6/443
385/114

FOREIGN PATENT DOCUMENTS

GB 2319350 A * 5/1998 ......... G02B 6/02395

* cited by examiner

*Primary Examiner* — Jerry M Blevins
(74) *Attorney, Agent, or Firm* — Larry Maxwell, Esq.; Smith Tempel Blaha LLC

(57) ABSTRACT

An optical fiber cable may include a cable jacket, a rigid tensile reinforcement member centered within the cable jacket, and a plurality of partially bonded optical fiber ribbons around the rigid tensile reinforcement member. The optical fiber cable does not include any buffer tubes but may include a cushioning layer adjacent the ribbons.

11 Claims, 3 Drawing Sheets

OPTICAL FIBER CABLE HAVING ROLLABLE RIBBONS AND CENTRAL STRENGTH MEMBER

CROSS-REFERENCE TO RELATED APPLICATION

The benefit of and priority to U.S. Provisional Patent Application No. 62/769,835, filed Nov. 20, 2018, entitled "ROLLABLE RIBBON CABLE WITH CENTRAL FRP MEMBER," is hereby claimed, and the contents thereof incorporated herein by this reference in their entirety as if fully set forth below and for all applicable purposes.

BACKGROUND

An optical fiber cable generally comprises two or more optical fibers enclosed within a jacket. A distribution cable is a type of optical fiber cable that is used to distribute optical signals from a central office to buildings, homes, and other sites (i.e., so-called "FTTx"), as well as to distribute optical signals to wireless network cell sites. It is common to branch and splice a distribution cable at various points along its length ("mid-span") into lower fiber count cables and drop cables.

In a loose tube distribution cable, multiple fibers may be organized into subunits by grouping them within sub-jackets or buffer tubes or by loosely wrapping groups of fibers in threads or yarns for ease of identification. Buffer tubes, like the cable jacket, are commonly made of a relatively stiff, hard material to help protect the fibers. However, buffer tubes commonly have a lower coefficient of thermal expansion than that of the cable jacket to help shield the fibers against detrimental effects of thermal expansion and contraction of the cable jacket.

The fibers in a distribution cable may be ribbonized. The term optical fiber "ribbon" refers to two or more parallel optical fibers that are joined together along their lengths. A material commonly referred to as a matrix adheres the fibers together. Ribbonization offers the benefit of mass fusion splicing. In a "flat" (also referred to as "encapsulated") type of optical fiber ribbon, the fibers may be fully or partially encapsulated within the matrix material along the entire length of the ribbon. The rigidity of conventional flat optical fiber ribbons presents challenges to achieving high fiber packing density in cables. Flat ribbons have other disadvantages in cables, such as preferential bending, and corner fibers exposed to stresses. So-called "rollable" or "partially bonded" optical fiber ribbons have been developed to achieve high fiber packing density and avoid some of the other disadvantages of flat ribbons. In a rollable or partially bonded ribbon, the matrix material is intermittently distributed along the fibers, providing sufficient flexibility to roll up each individual ribbon about an axis parallel to the fibers or otherwise compact the ribbon into a fiber bundle with a roughly cylindrical shape.

To provide high tensile strength needed to meet installation load standards, a semi-rigid reinforcing member, such as a fiberglass-epoxy or aramid-epoxy composite rod or a solid steel wire, may be located centrally within the cable. Buffer tubes may be arrayed around the central reinforcing member.

Another type of optical fiber cable is known as slotted core. A slotted core cable features a plastic (e.g., polyethylene) core having a radial array of arms, such that the spaces between adjacent arms define slots in which the ribbons are retained. A semi-rigid reinforcing member may be located centrally within the core.

Providing compact, high packing density optical fiber distribution cables that meet installation load requirements, facilitate mid-span access, and provide other advantages over prior distribution cables presents challenges, which may be addressed by the present invention in the manner described below.

SUMMARY

The present invention relates generally to optical fiber distribution cables. In an exemplary embodiment, an optical fiber cable may include a cable jacket, a rigid tensile reinforcement member centered within the cable jacket, and a plurality of partially bonded optical fiber ribbons around the rigid tensile reinforcement member. The optical fiber cable does not include any buffer tubes but may include one or more cushioning layers adjacent the ribbons. For example, a cushioning layer may be located between the ribbons and the cable jacket. Alternatively, or in addition, a cushioning layer may be included between the ribbons and the rigid tensile reinforcement member.

Other cables, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
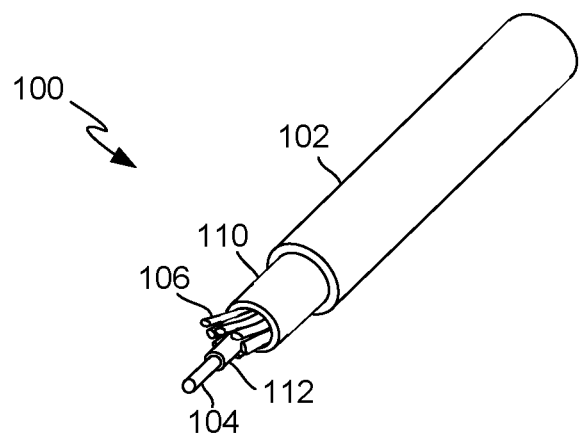
FIG. 1 is a perspective view of an optical fiber cable, in accordance with exemplary embodiments of the invention.
Figure 2:
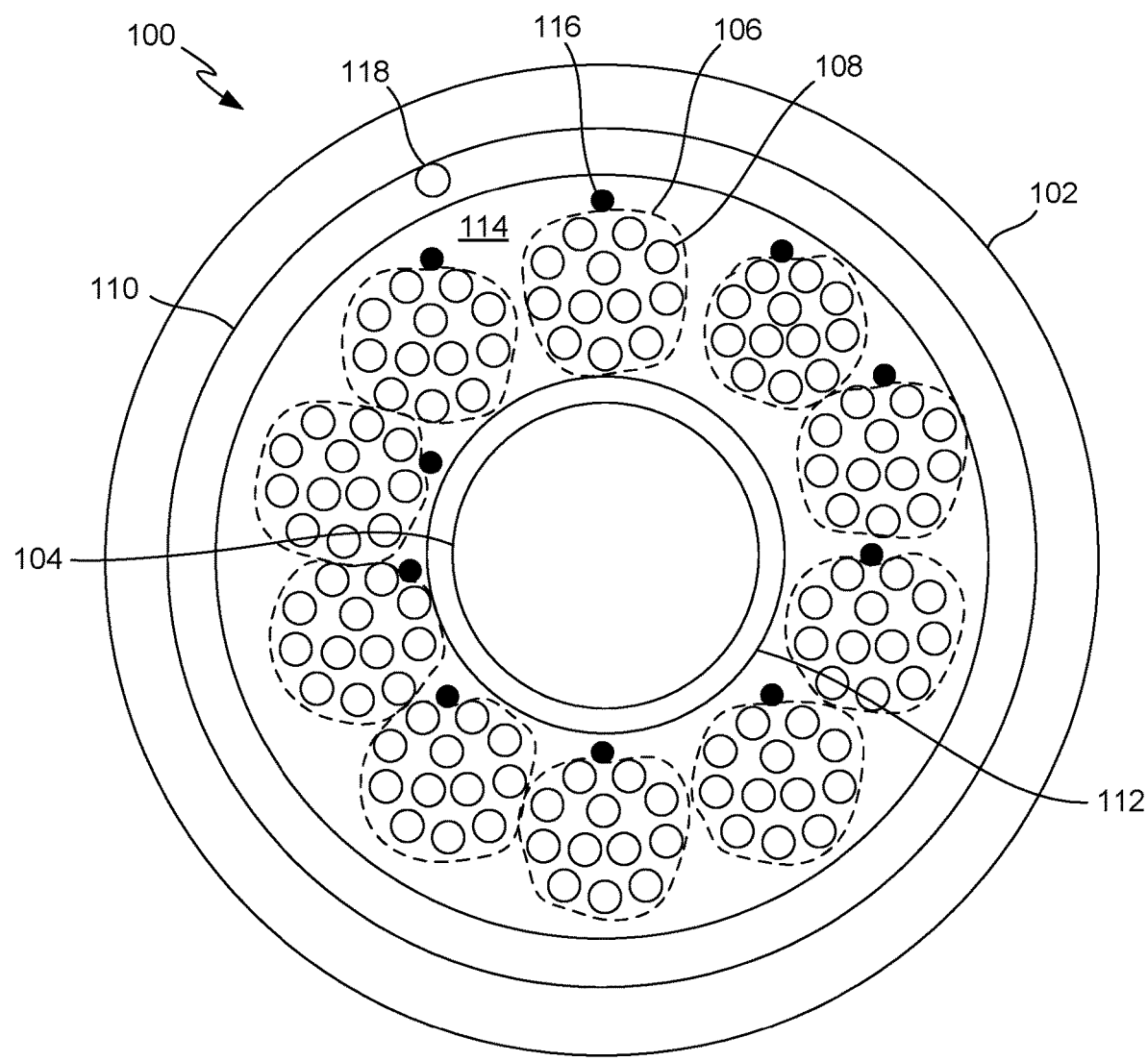
FIG. 2 is a cross-sectional view the optical fiber cable of FIG. 1.

As illustrated in FIGS. 1-2 (not to scale), in an illustrative or exemplary embodiment of the invention, an optical fiber cable 100 includes a cable jacket 102, rigid tensile reinforcement member 104, and two or more "rollable" (also referred to as "partially bonded") ribbons 106. Although for purposes of illustration (FIG. 2) optical fiber cable 100 may have exactly 10 partially bonded ribbons 106, a cable in accordance with the present disclosure may have any other number of such ribbons.

Each of ribbons 106 comprises individual optical fibers 108 (not shown in FIG. 1 for purposes of clarity), as described below in further detail with regard to FIG. 3. Although for purposes of illustration (FIGS. 2-3) each ribbon 106 may have exactly 12 optical fibers 108, in other embodiments each such ribbon may have any number of such fibers. Accordingly, in the exemplary embodiment illustrated in FIGS. 1-3 optical fiber cable 100 has a total of exactly 120 optical fibers 108. Optical fibers 108 may have a standard size, such as an overall diameter of 200 or 250 μm.

Rigid tensile reinforcement member 104 is centrally located within cable jacket 102, i.e., approximately along a longitudinal axis of optical fiber cable 100. Rigid tensile reinforcement member 104 may be made of, for example, a fiberglass-epoxy or aramid-epoxy composite rod or a solid steel wire. Rigid tensile reinforcement member 104 is "rigid" (i.e., has high tensile modulus) with respect to other elements of optical fiber cable 100 and thus substantially provides the tensile reinforcement to optical fiber cable 100 necessary to meet installation load standards.

Ribbons 106 may be stranded around rigid tensile reinforcement member 104. The stranding may be of the "S-Z" type, where the twist direction alternates between clockwise and counter-clockwise, reversing after a certain number of twists. Alternatively, the stranding may be helical. Stranding ribbons 106 around rigid tensile reinforcement member 104 rather than laying ribbons 106 parallel to rigid tensile reinforcement member 104 provides the advantage of allowing optical fiber cable 100 to be pulled at higher tensions than some prior (e.g., central tube) cables while reducing fiber strain for a given amount of cable strain. It also allows for bending strain to be averaged across the optical fibers in tight slack storage coils often used in distribution cable applications. Stranding ribbons with an S-Z twist also has the advantage of providing extra ribbon length at the reversal points between S and Z twisted sections, making mid-span access easier in distribution cables.

In some embodiments, optical fiber cable 100 may further include at least one cushioning layer 110 between ribbons 106 and cable jacket 102. Cushioning layer 110 may be a coating (i.e., adhered to cable jacket 102 or otherwise tightly fitted), it may be a tube (i.e., more loosely fitted within cable jacket 102), or it may take the form of a tape wrapped around ribbons 106. Alternatively, or in addition, optical fiber cable 100 may further include a cushioning layer 112 between ribbons 106 and rigid tensile reinforcement member 104. Cushioning layer 112 may be a coating (i.e., adhered to rigid tensile reinforcement member 104 or otherwise tightly fitted), it may be a tube (i.e., more loosely fitted around rigid tensile reinforcement member 104), or it may take the form of a tape wrapped around ribbons 106. Cushioning layers 110 and 112 may be foamed (chemically or physically).

Cushioning layers 110 and 112 serve to protect ribbons 106. Cushioning layers 110 and 112 help prevent microbending or macrobending loss, provide crush resistance, and may also help keep ribbons 106 in place. The outer layer (not separately shown) may also serve as a "warning track" indication to an installer during an installation process that fibers are nearing the surface, and can be aid the installer in setting blade depth during the stripping process to avoid nicking fibers. Accordingly, cushioning layers 110 and 112 may be made of a material that is relatively soft and flexible compared with the materials of which cable jacket 102 and rigid tensile reinforcement member 104 are made. For example, cushioning layers 110 and 112 may be include one or more of: linear low-density polyethylene (LLDPE), ethylene-vinyl acetate (E-VA) copolymer, polyvinyl chloride (PVC), ethylene rubber, propylene rubber, and thermoplastic elastomer (TPE), including thermoplastic urethane (TPU) elastomers. Such materials and other suitable materials may be characterized generally by a Young's modulus in the range of 10-200 MPa and a either a Shore D hardness less than 50 or a Shore A hardness less than 95. However, materials that would tend to leave a (e.g., sticky) residue on the fibers are not suitable.

Note that optical fiber cable 100 does not include any buffer tubes or a central tube for containing ribbons 106. Rather, as illustrated in FIGS. 1-2 with regard to an exemplary embodiment, ribbons 106 are located within a space 114 between cushioning layers 110 and 112. Ribbons 106 are adjacent cushioning layers 110 and 112 and thus cushioned between them. The elasticity or low Young's modulus of cushioning layers 110 and 112 may be contrasted with the rigidity or high Young's modulus of conventional buffer tubes or central tubes made of high-density polyethylene, polypropylene, etc.

Alternately, cushioning layers 110 and 112 may take the form of a tape, including tapes made from one or more of nonwoven polyester, nonwoven polypropylene, or extruded materials including one or more of: linear low-density polyethylene (LLDPE), ethylene-vinyl acetate (E-VA) copolymer, polyvinyl chloride (PVC), ethylene rubber, propylene rubber, and thermoplastic elastomer (TPE), including thermoplastic urethane (TPU) elastomers. The tape may include material that has been foamed (chemically of physically).

One or both of cushioning layers 110 and 112 may include a water-swellable material, such as a super-absorbent polymer, that provides a water-blocking function. One or both of cushioning layers 110 and 112 may include flame retardant material, such as metal hydrates (e.g., magnesium dihydrate, aluminum trihydrate, etc.). The water-swellable and/or flame retardant material may be compounded with the above-described materials (e.g., LLDP, E-VA, PVC, etc.) of which cushioning layers 110 and 112 may be made, so as to provide a homogeneous cushioning layer 110 or 112. Alternatively, the water-swellable material and/or flame retardant material may be a coating.

A binding thread 116 may be twisted (e.g., helically with respect to the length or extent of optical fiber cable 100) around a bundle of one or more ribbons 106. Binding threads 116 may be color coded to aid identification of ribbons 106 or bundles of two or more ribbons 106. However, other methods of fiber and ribbon identification, such as printing of various shapes, numbers, or letters, on the ribbons and fibers may also be used. Binding thread 116 may include (e.g., be coated with or impregnated with) a water-swellable material. In the embodiment illustrated in FIGS. 1-2, a binding thread 116 is twisted around each of ribbons 106 (as generally indicated in broken line around each of ribbons 106). Nevertheless, in other embodiments (not shown) one or more binding threads may be configured around a bundle of two or more ribbons. Also, although in the illustrated embodiment binding thread 116 serves as a bundling structure around a bundle of one or more ribbons 106, in other embodiments (not shown) such a bundling structure may comprise alternative or additional elements, such as a nonwoven or paper tape (e.g., between the binding thread and ribbon). Such other bundling structures may include a water-swellable material.

One or more ripcords 118 may be provided under cable jacket 102 to aid removing a portion of cable jacket 102 for splicing or other mid-span access. Also, as ribbons 106 are not contained within any buffer tubes or a central tube, a cable in accordance with the present disclosure provides benefits that include facilitating mid-span access to ribbons 106.

Figure 3:
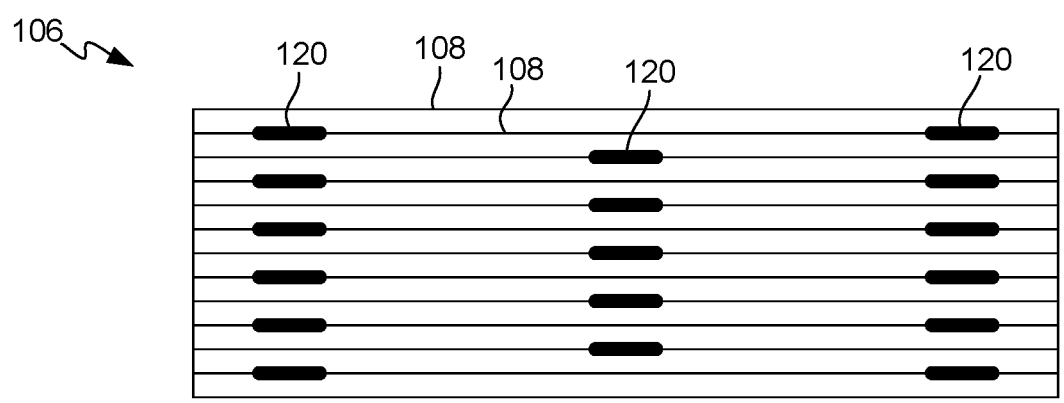
FIG. 3 is a plan view of a rollable or partially bonded optical fiber ribbon.

An exemplary structure of each of ribbons 106 is shown in FIG. 3. Ribbon 106 comprises two or more optical fibers 108 joined to each other intermittently along their lengths with patches of adhesive, commonly referred to as a matrix material 120. The pattern of matrix material 120 shown in FIG. 3 or other characteristics of ribbon 106 described herein are intended only as examples, and one of ordinary skill in the art will recognize that other types of rollable or partially bonded optical fiber ribbon are suitable.

As well understood by one of ordinary skill in the art, while ribbon 106 has the ribbon shape shown in FIG. 3 when laid flat with its optical fibers 108 arrayed parallel to each other, optical fibers 108 can also roll into or otherwise assume a compact bundle or roughly cylindrical shape. That is, the intermittent rather than continuous distribution of matrix material 120 provides ribbon 106 with sufficient flexibility to be rolled about an axis substantially parallel to the fibers. The terms "rollable" and "partially bonded" are understood by one of ordinary skill in the art in the context of optical fiber ribbons to specifically refer to a ribbon having this characteristic, provided by the intermittent rather than continuous distribution of matrix material 120. A "rollable" ribbon may be contrasted with what is commonly referred to in the art as a "flat" or "encapsulated" ribbon, in which matrix material is distributed continuously along the length of the fibers. In a flat ribbon, the fibers may be fully encapsulated within the matrix material. The rigidity of encapsulated optical fiber ribbons presents challenges to achieving high fiber packing density in cables. The development of rollable ribbons has led to higher fiber packing density in cables.

Including optical fibers 108 in the form of rollable or partially bonded ribbons 106, combined with the absence of buffer tubes or a central tube promotes high packing density. For purposes of this disclosure, packing density is defined as the ratio between the total cross-sectional area of the optical fibers 108 and the cross-sectional area of the cable jacket 102 interior. Also, as noted above, the absence of buffer tubes or a central tube facilitates mid-span access to ribbons 106.

One or more illustrative or exemplary embodiments of the invention have been described above. However, it is to be understood that the invention is defined by the appended claims and is not limited to the specific embodiments described.

What is claimed is:

1. An optical fiber cable, comprising:
   a cable jacket;
   a rigid tensile reinforcement member centered within the cable jacket;
   a plurality of partially bonded optical fiber ribbons around the rigid tensile reinforcement member, wherein the optical fiber cable includes no buffer tubes or central tube enclosing the optical fiber ribbons; and
   a cushioning layer having a Young's modulus in a range of 10-200 megapascal (MPa) adjacent the plurality of partially bonded optical fiber ribbons.

2. The optical fiber cable of claim 1, wherein the plurality of partially bonded optical fiber ribbons are stranded around the rigid tensile reinforcement member.

3. The optical fiber cable of claim 1, wherein at least one of the plurality of partially bonded optical fiber ribbons is bundled by a thread.

4. The optical fiber cable of claim 1, wherein the cushioning layer is between and in direct contact with the plurality of partially bonded optical fiber ribbons and the cable jacket.

5. The optical fiber cable of claim 1, wherein the cushioning layer comprises one or more of: linear low-density polyethylene (LLDP), ethylene-vinyl acetate (E-VA) copolymer, polyvinyl chloride (PVC), ethylene rubber, propylene rubber, and thermoplastic elastomer (TPE).

6. The optical fiber cable of claim 1, wherein the cushioning layer includes a water-swellable material.

7. The optical fiber cable of claim 1, wherein the cushioning layer is between and in direct contact with the plurality of partially bonded optical fiber ribbons and the rigid tensile reinforcement member.

8. An optical fiber cable, comprising:
   a cable jacket;
   a rigid tensile reinforcement member centered within the cable jacket;
   a plurality of partially bonded optical fiber ribbons stranded around the rigid tensile reinforcement member, wherein the optical fiber cable includes no buffer tubes or central tube enclosing the optical fiber ribbons;
   a first cushioning layer having a Young's modulus in a range of 10-200 megapascal (MPa) between the plurality of partially bonded optical fiber ribbons and the cable jacket; and
   a second cushioning layer having a Young's modulus in the range of 10-200 MPa between the plurality of partially bonded optical fiber ribbons and the rigid tensile reinforcement member.

9. The optical fiber cable of claim 8, wherein each of the first and second cushioning layers comprises one or more of: linear low-density polyethylene (LLDP), ethylene-vinyl acetate (E-VA) copolymer, polyvinyl chloride (PVC), ethylene rubber, propylene rubber, and thermoplastic elastomer (TPE).

10. The optical fiber cable of claim 8, wherein each of the first and second cushioning layers includes a water-swellable material.

11. The optical fiber cable of claim 8, wherein at least one of the plurality of partially bonded optical fiber ribbons is bundled by a thread.

\* \* \* \* \*